(12) United States Patent
Babacan

(10) Patent No.: US 6,582,744 B1
(45) Date of Patent: Jun. 24, 2003

(54) INTEGRATED COOKING AND CUTTING INSTRUMENT FOR FAST FOOD DONER KEBAB AND METHOD THEREFOR

(75) Inventor: Ayhan Babacan, Meseli Sok. 38/1, 4. Levent, 80620 Istanbul (TR)

(73) Assignee: Ayhan Babacan (TR)

( * ) Notice: Subject to any disclaimer, the term of this patent is extended or adjusted under 35 U.S.C. 154(b) by 0 days.

(21) Appl. No.: 09/530,177

(22) PCT Filed: Apr. 3, 1998

(86) PCT No.: PCT/TR98/00007
§ 371 (c)(1),
(2), (4) Date: Apr. 20, 2000

(87) PCT Pub. No.: WO99/51135
PCT Pub. Date: Oct. 14, 1999

(51) Int. Cl.[7] .............................. A22C 7/00; A23P 1/12
(52) U.S. Cl. ...................... 426/513; 426/518; 426/523; 99/326; 99/334; 99/349; 99/355; 99/357; 99/396; 99/427; 99/430; 99/448; 99/567; 83/485; 83/704; 83/733; 83/932
(58) Field of Search .......................... 99/326, 331, 334, 99/352, 355, 357, 537, 538, 448, 349, 329 P, 329 RT, 353, 391, 396, 392, 427, 567, 430; 83/932, 733, 704, 485; 426/523, 518, 513, 517

(56) References Cited

U.S. PATENT DOCUMENTS

| | | | | |
|---|---|---|---|---|
| 1,358,365 A | * | 11/1920 | De Matteis | |
| 3,956,979 A | * | 5/1976 | Coroneos | 99/421 V |
| 4,018,145 A | * | 4/1977 | Hensel | 99/458 |
| 4,300,443 A | * | 11/1981 | Morcos et al. | 99/332 |
| 4,512,248 A | * | 4/1985 | Volakakis | 99/341 |
| 5,121,677 A | * | 6/1992 | Le Claire et al. | 99/357 |
| 5,357,853 A | * | 10/1994 | Nelson et al. | 99/538 |
| 5,473,979 A | * | 12/1995 | Ruben | 99/446 |
| 5,546,848 A | * | 8/1996 | Naramura | 99/326 |
| 5,921,170 A | * | 7/1999 | Khatchadourian et al. | 99/349 |

FOREIGN PATENT DOCUMENTS

| | | | |
|---|---|---|---|
| FR | 2572894 | * | 5/1986 |
| GB | 2218327 A | * | 11/1989 |
| GB | 2271274 A | * | 4/1994 |
| GB | 2294195 A | * | 4/1996 |

* cited by examiner

Primary Examiner—Keith Hendricks
Assistant Examiner—Drew Becker
(74) Attorney, Agent, or Firm—Orum & Roth

(57) ABSTRACT

The present invention is a method for cooking, cutting and preparing the doner meat automatically and without any human intervention in the same amount and form for service and an integrated instrument for cooking and cutting doner. This invention relates to a method for cooking the front sides of the meat boxes which are filled and frozen beforehand, by rotating said meat boxes around a center arranged circularly or with multi sides having 4, 5 or 7 cookers (radiant or LPG), cutting the cooked meat part and sending the cooked meat part for cooking again by rotating around itself and carrying out of these operations at a pre-determined amount and speed without human intervention controlled from a central command and turning table and a integrated doner cooking and cutting instrument for performing this method.

36 Claims, 10 Drawing Sheets

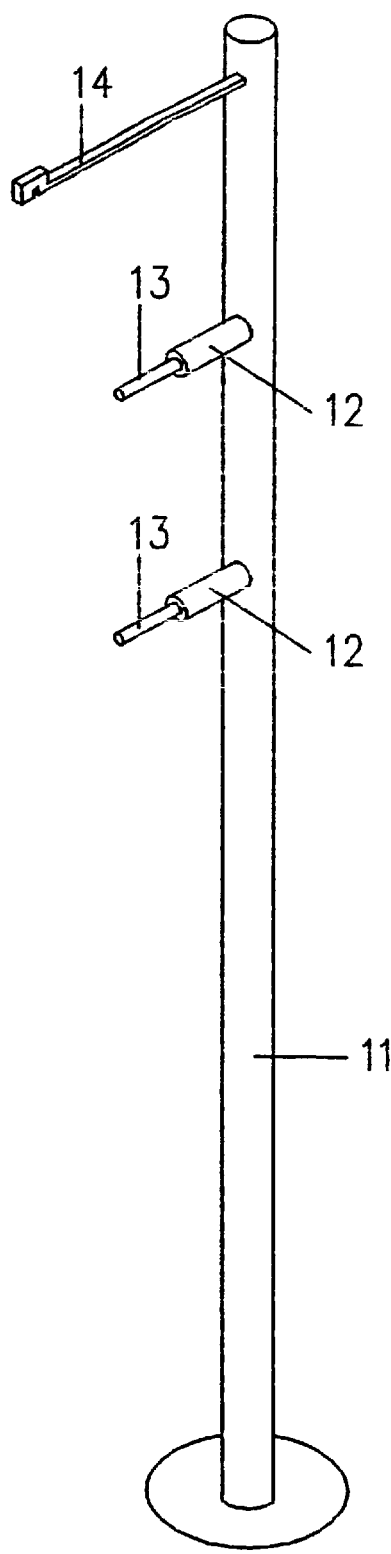
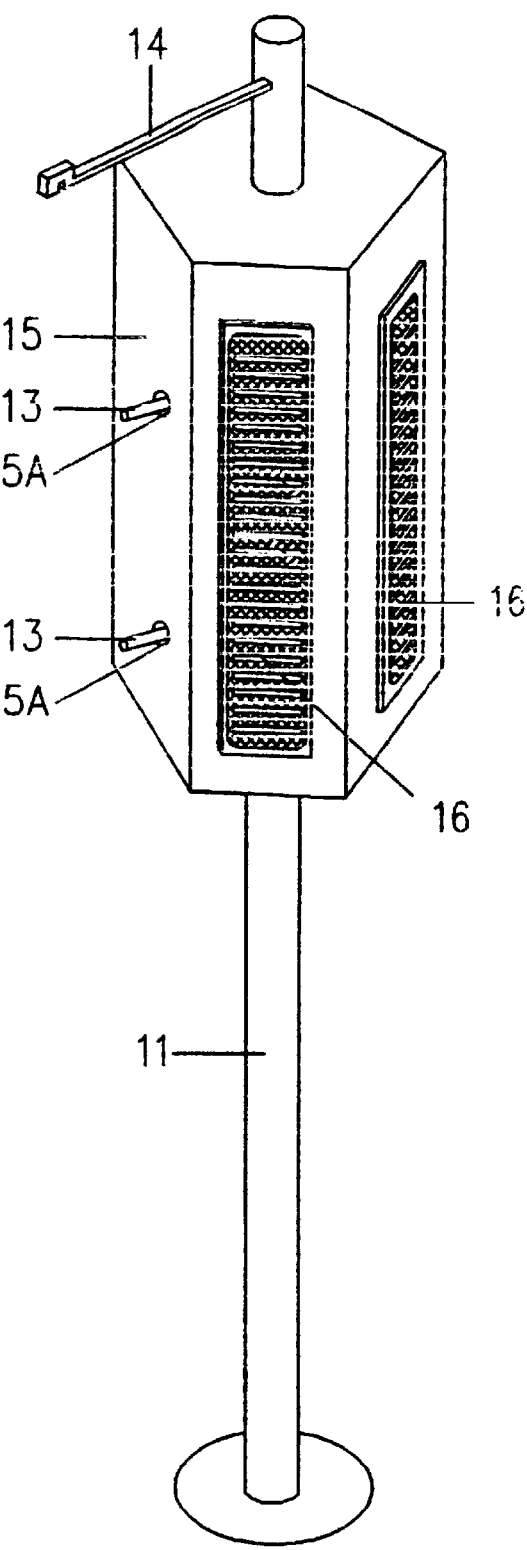
FIGURE-10
FIGURE-11

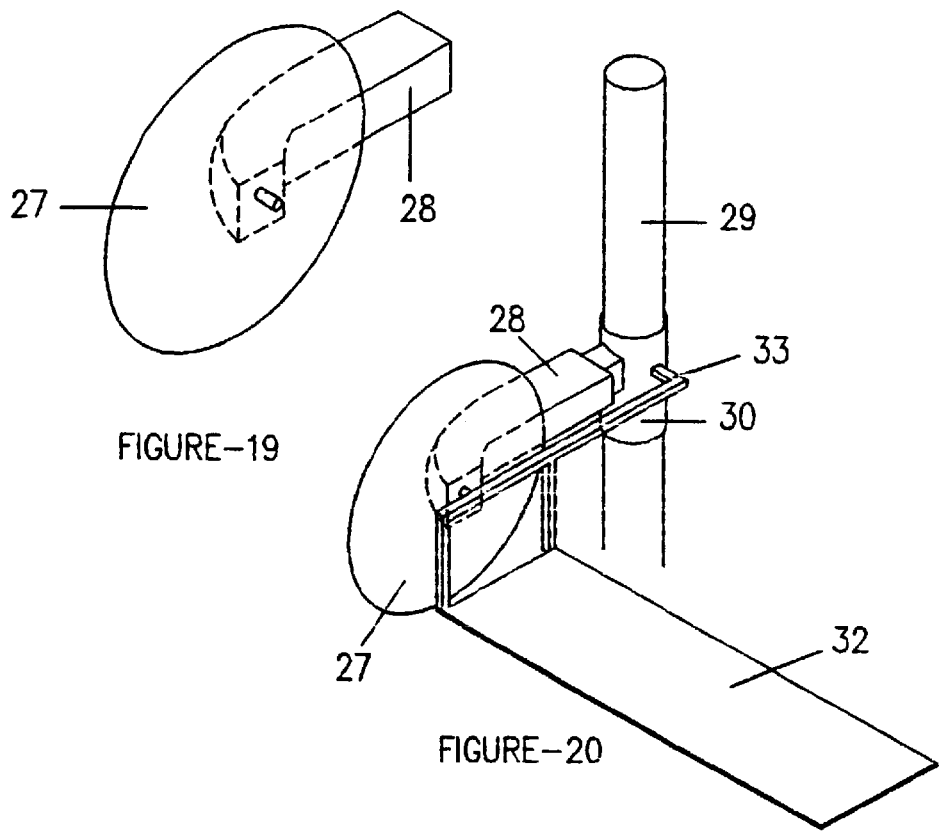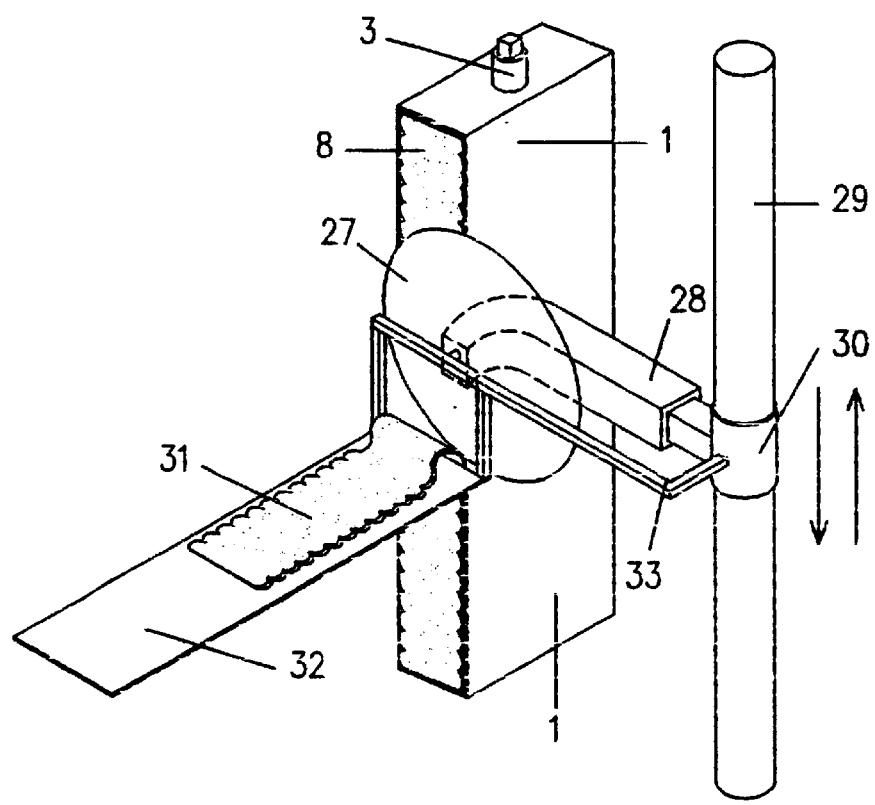

US 6,582,744 B1

INTEGRATED COOKING AND CUTTING INSTRUMENT FOR FAST FOOD DONER KEBAB AND METHOD THEREFOR

DESCRIPTION

The present invention relates to a method for obtaining cooked doner meat within the speed, the hygienic conditions, the form and the standards required by a fast food system and an integrated doner broiling and cutting instrument for achieving this method.

TECHNICAL FIELD OF THE INVENTION

The field of the invention and the technique for making Turkish Doner Kebab is known. In conventional methods a grill bar, usually vertical, dressed with doner material of meat and minced meat cooked, is rotated on its vertical axis in front of a cooker and the broiled parts of the meat is cut with a knife in a vertically downward fashion.

According to said method, rotation of the meat cylinders arranged around the grill bar in the said order were tried in different ways, namely, vertically and horizontally, different types of cookers were tried, electrical knives were used for cutting but no alternative solution or modification could be provided for the traditional way of rotating the meat on the grill axis in front of a cooker and cutting the broiled parts by a human operated knife. The most improved variation of the traditional method comprises the preparation and freezing of the blocks of meat at a central place and transmitting the frozen meat blocks to the cooking station, and using electrical knives in cutting the broiled meat. Presently, there is no method or instrument, known or used, both for broiling and cutting the doner meat in the same amount, and form, ready to serve, without human intervention.

Publications representing the State-of-the-Art are the British Patent No. 2,218,327—MICHAEL ZANNETOS, British Patent No. 2,271,274—MUSTAFA KAYA TUREDI, European Patent Application No. 85300967.8—OZORAN LIMITED, and as it is known from all of these documents, the doner meat to be cooked is aligned in a row around a single grill bar and a single bar of meat is rotated in front of a single cooker and the cooked meat is cut off by a man operated knife or various other cutting tools, thus made ready to serve. Neither of the above publications comprises the act of putting ready-to-cook meat into boxes and depending on the preferences or needs, placing 5, 6 or 8 meat boxes onto a rotating carrier chassis and rotating all of them together around 4, 5 or 7 separate cookers, thus progressively broiling the meats inside the boxes without human intervention and cutting them into ready-to-service doner meat of the same standard cooking degree and amount and within the pretermined time.

Therefore, as a result of the presently known technique, standard form or standard weight has never been achieved in obtaining cooked and ready-to-serve doner meat. The process of rotating and cutting could not be automated, and they were carried on by man or a man operated knife. The speed of obtaining cooked meat has been limited to the broiling speed of the meat in a single block, and standardisation, speed and practicality of a fast food system could not be obtained. The hygienic conditions, left only to the operator, were far from being consistently clean.

On the other hand, the present invention provides the automation and standardisation required in a fast-food system as described herein below; all of the parts constituting the integrated broiling and cutting device of the invention are controlled by motors directed from a central control panel and they can be operated in co-operation and as a whole in an automatic way, and the integrated broiling and cutting device could be adjusted to obtain the desired amount of meat at a desired broiling rate. As a result, all of the operations, either in small businesses or big ones could be carried out without direct human intervention and the broiled and cut meat is obtained in a standard form and weight.

Integrated doner broiling and cutting device of the invention comprises separate units each carrying out a different operation: 1) Meat boxes, 2) Broiling unit, 3) Rotating unit, 4) Cutting unit and 5) Central control and adjustment panel.

Parts making up the integrated doner broiling and cutting device of the invention and their connection are shown in the enclosed drawings, in which;

DESCRIPTION OF THE DRAWINGS

FIG. 10—shows the central fixed bar (11) carrying the fixed cookers on it, and the 2 pushing pistons (12), the piston arms (13) and the rotating arm (14).

FIG. 11—shows the central fixed bar (11) with cookers (16) arranged in a pentagon fashion on it and the projecting two pushing piston arms (13) and the rotating arm (14).

FIG. 19—shows the cutting unit of the cutting group comprising the disc knife (27) and the knife motor (28).

FIG. 20—shows the cutting unit of the cutting group comprising disc knife (27) and the knife motor (28) and the fixed horizontal plane (32) placed in front of it, the plane connected to the fixed bar (29) that carries them.

FIG. 21—shows the cutting unit of the cutting group comprising disc knife (27) and the knife motor (28) and the fixed horizontal plane (32) placed in front of said unit, wherein said unit and fixed horizontal plane are connected to the fixed bar (29) carrying them, and the cooked meat slice at the open front side (8) of the meat box (1) is cut and the cooked meat slice (31) lies on the horizontal plane (32).

DETAILED DESCRIPTION

1—Meat Boxes

The boxes are filled with meat in butchery, are let frozen and are sent to businesses having cooker groups inside refrigerated containers.

Figure 1:
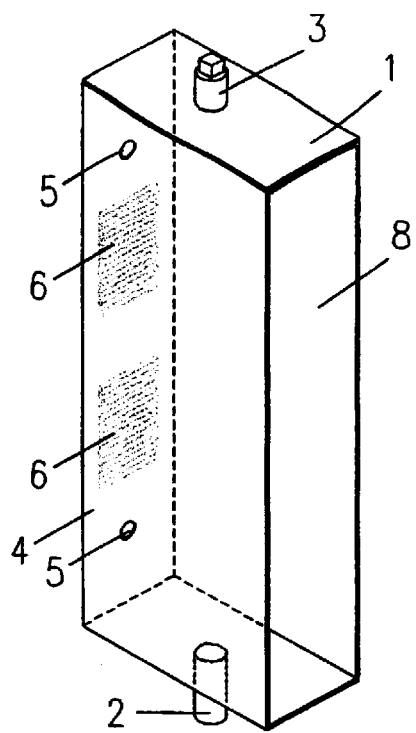
FIG. 1—is a perspective view of the meat box (1) from the front quarter.
Figure 2:
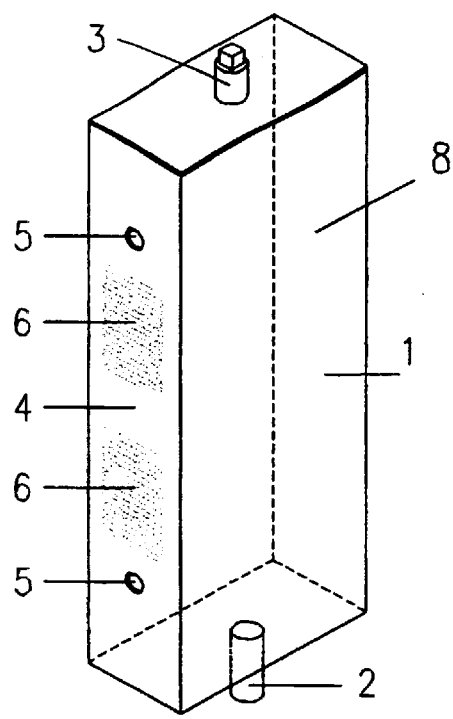
FIG. 2—is a perspective view of the meat box (1) from the rear quarter.
Figure 3:
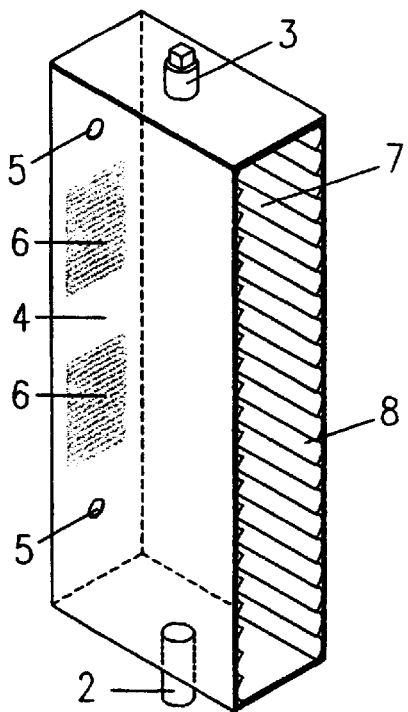
FIG. 3—is a perspective view of the meat box (1) from the front quarter with the interior wall (7) placed in it.
Figure 4:
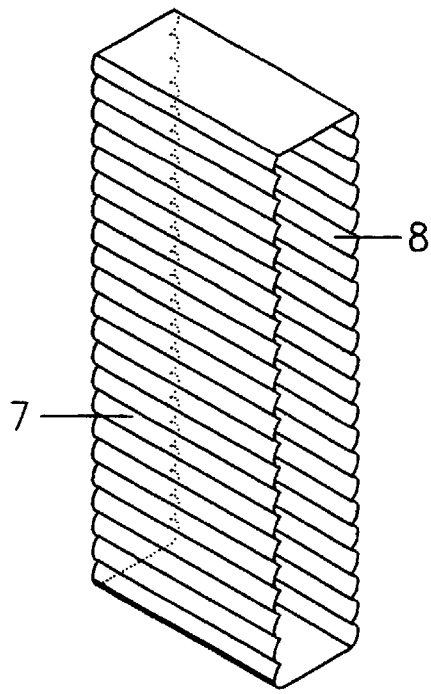
FIG. 4—is a perspective view of the interior wall (7) placed inside the meat box (1) with the meat inside it, from the front quarter.
Figure 5:
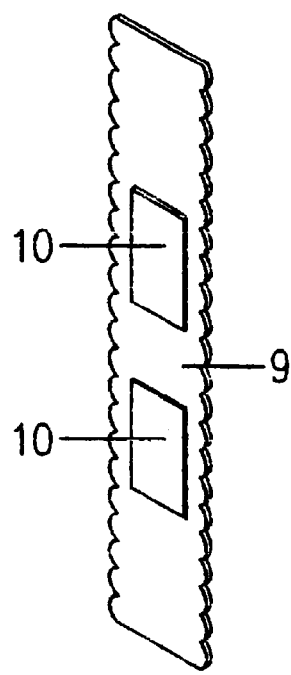
FIG. 5—shows the movable pushing plate (9) whose side surface is similar to the edge of the interior wall (7) of FIG. 4 and which constitutes the rear surface of the interior wall (7), and the two resilient arms (10) in which they are rearwards unopened.
Figure 6:
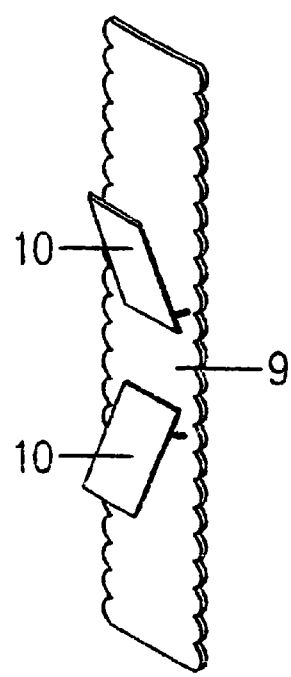
FIG. 6—shows the two resilient arms (10) in a rearwards open state behind the movable pushing plate (9) of FIG. 4, when it is pushed forward, whose side surface is similar to the edge of the interior wall (7) of FIG. 4 and which constitutes the rear surface of the interior wall (7).
Figure 7:
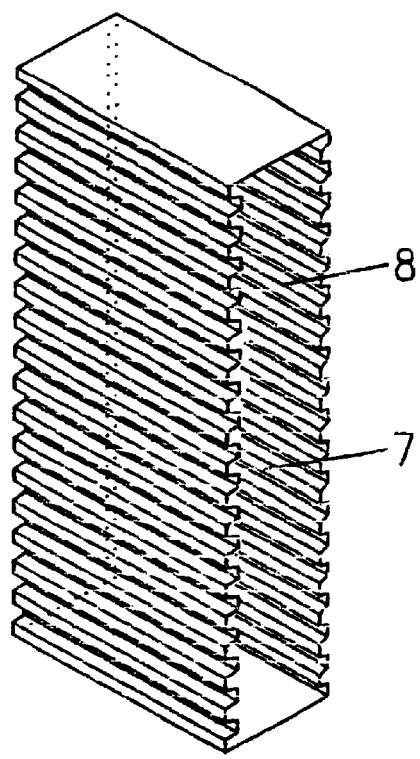
FIG. 7—is another view of the interior wall (7) where meat is placed, showing that the side edges of the interior wall (7) could be in any other desired form.
Figure 8:
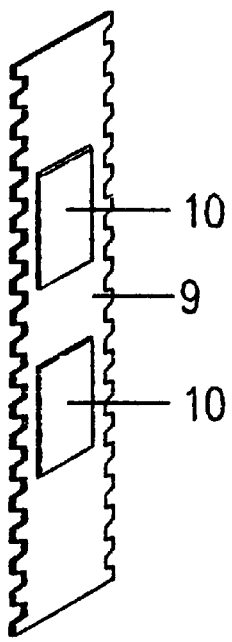
FIG. 8—shows the movable pushing plate (9) whose side surface is similar to the edge of the interior wall (7) of FIG. 7, and which constitutes the rear surface of the interior wall (7), together with the two resilient arms (10) in a rearwards unopened state.
Figure 9:
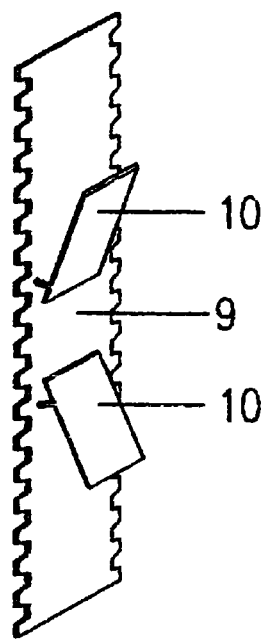
FIG. 9—shows the two resilient arms (10) opened rearward behind the movable pushing plate (9), when it is pushed forward, whose side surface is similar to the edge of the interior wall (7) of FIG. 4 and which constitutes the rear surface of the interior wall (7).
Figure 12:
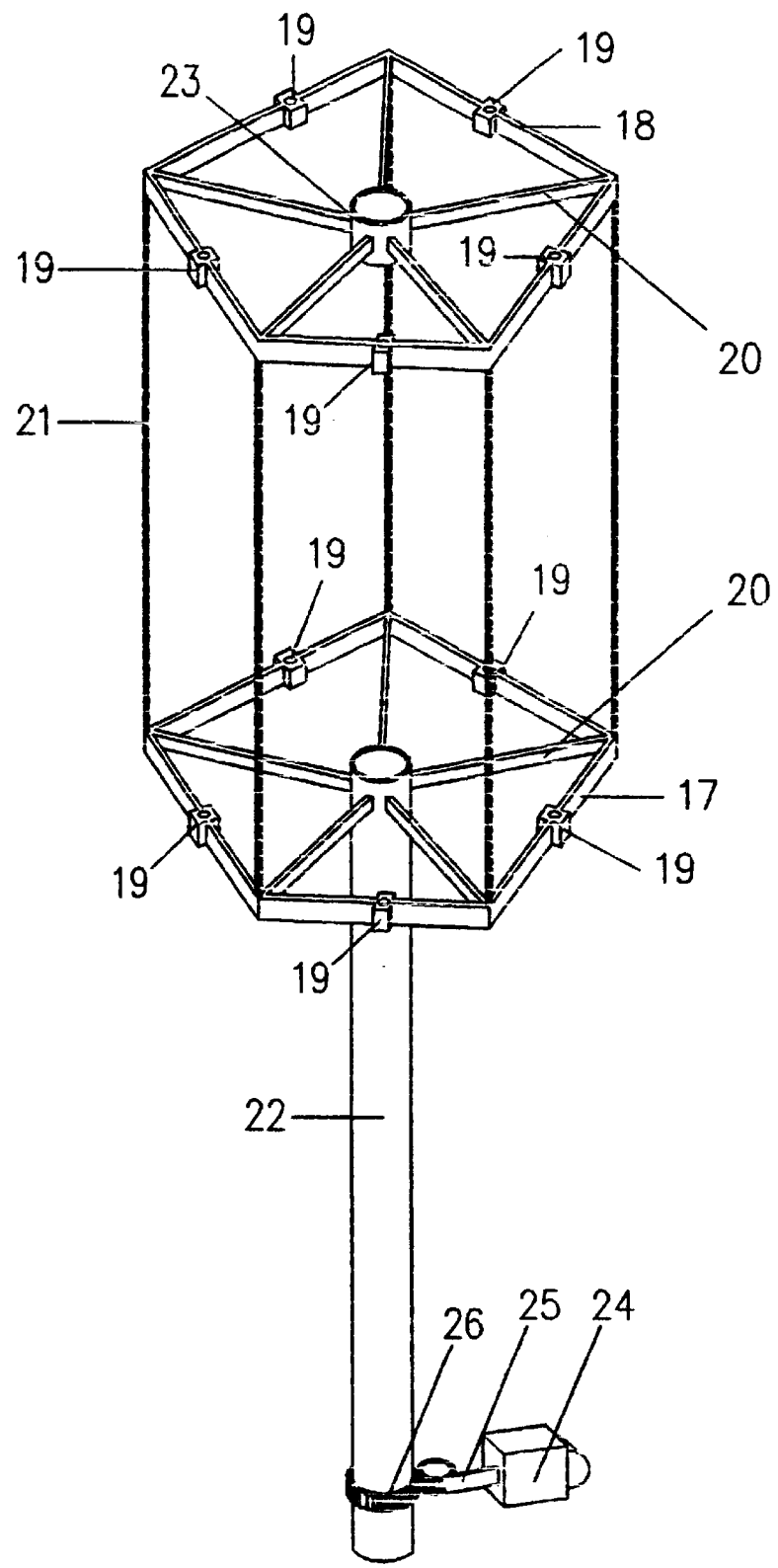
FIG. 12—shows the carrier chassis forming the rotating group where the meat boxes (1) are seated which that can be configured as a pentagon, hexagon, or an octagon.
Figure 13:
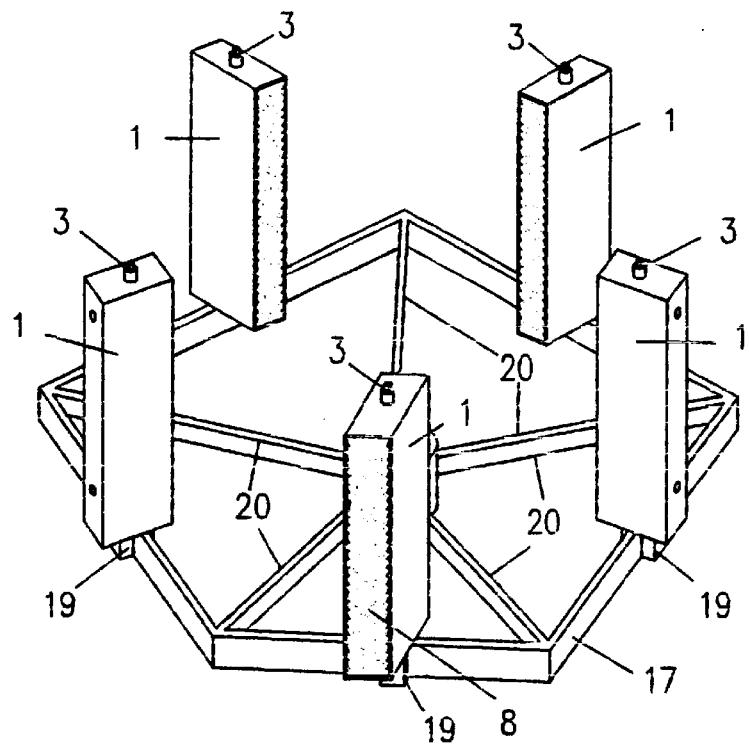
FIG. 13—shows five meat boxes (1) placed on top of the pentagonal lower frame (17) of the rotating group's carrier chassis, and the meat box at the front has its open front face turned outwardly in order to slice the cooked meat, and is ready to be cut.
Figure 14:
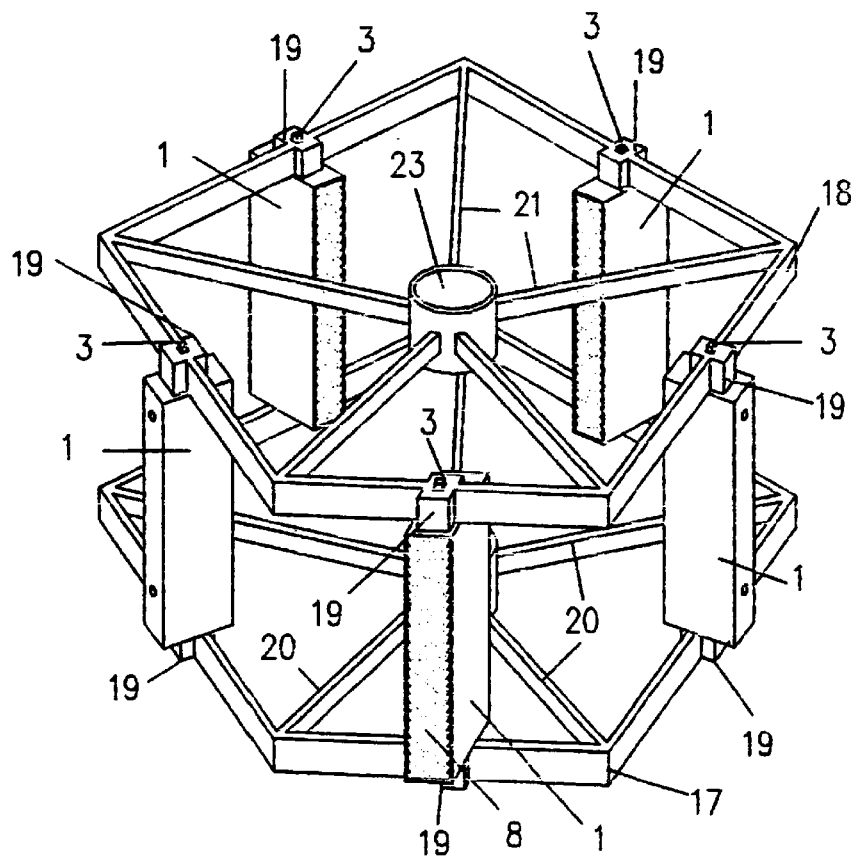
FIG. 14—shows 5 meat boxes (1) placed on top of the pentagonal lower frame (17) and upper frame of the rotating group's carrier chassis, and the meat box at the front has its open front face turned outwardly in order to slice the cooked meat, and is ready to be cut.

Meat boxes (1) are preferably 10 cm×60 cm with 15 cm depth, made of stainless steel with an open front side (8), there are pins (2), (3) in the middle of the lower and upper walls of the meat boxes (1) in order to seat them, as shown in FIGS. 12, 13 and 14, on the seats (19) in the lower (17) and upper frames (18) which could be pentagonal, hexagonal or octagonal. There are two holes (5), a lower and an upper one, at the closed rear side (4) of the meat boxes (1). The meat boxes (1) also comprise in its inner part a thin interior wall (7) of stainless steel. This interior wall (7) is inserted and fixed into the meat box (1) as seen in FIG. 3, so that the front side of the meat (8) is open. As seen in FIGS. 4 and 7, this interior wall (7) may have different edge forms so that it gives a certain form to the cooked meat besides preventing any contraction that may take place in the meat block during cooking. At the back of this interior wall (7) there is a mobile pushing plate (9) constituting the rear side of the wall and whose edges have the same form as the edge of the said interior wall. As may be seen in FIGS. 5, 6 and 8, 9, side edges of the mobile pushing plate (9) the rear side of the interior wall (7), have to have the same form as the side edges of the interior wall (7) which can be in any desired form. FIGS. 4, 5 and 6, and FIGS. 7, 8 and 9 are organised to emphasise and show this point. Said mobile pushing plate (9) can go forward and rearward at a right angle inside the interior wall (7) having the same edge form, and it is being pushed from behind each time to go forward and push the meat block (8A) inside the interior wall 3 mm forwards so that it is read to be cut. The mobile pushing plate (9) pushed by the piston pushing arms (13) of the two pistons (12) located at the side (15) of the instrument where there is no cooker and connected to the fixed bar (11) at the centre of the cooker group, towards the open front side (8) of the meat box (1) so that the cooked part of the meat is pushed 3 mm out from the meat box (1) for cutting. After this cooked meat of 3 mm is cut the meat box is sent for cooking again.

There are two resilient arms (10) behind the mobile pushing plate (9) ensuring that it stays there after each time it is pushed. These resilient arms are opened one step back each time the mobile pushing plate (9) is pushed forward 3 mm, and they enter the gear openings (6) at the rear wall of the box, thus, they stand at a right angle inside the mobile pushing plate (9) behind the meat box (8A) without coming back and are ready for the next 3 mm push.

2—Cooker Group

The cooker group comprises 4, 5, 7 units of (LPG or radian) cookers (16) that are pentagonally, hexagonally or octagonally arranged and vertically standing on the fixed bar (11) at the centre of the system, as seen in FIGS. 16, 17, 18 and 22. A pentagonal instrument (FIG. 16) has been arranged to have 4 cooker stations (16) and a cutting station without cooker (15), a hexagonal instrument (FIG. 17) to have 5 cooker stations (16) and a cutting station without cooker (15), and a octagonal instrument (FIG. 18) to have 7 cookers (16) and a cutting station without cooker (15). In each cutting station without cooker (15), there are two holes (5A) through which piston pushing arms (13) of the pushing pistons (12) connected to the fixed main bar (11) do project. These piston pushing arms (13) also enter the holes (5) at the rear side (4) of the meat box (1). The height of the cookers (16) is the same as the meat box (1). Cooking heat provided by each cooker (16) (radian or LPG) could be tuned progressively according to the desired cooking degree or temperature.

3—Rotating Group

Figure 23:
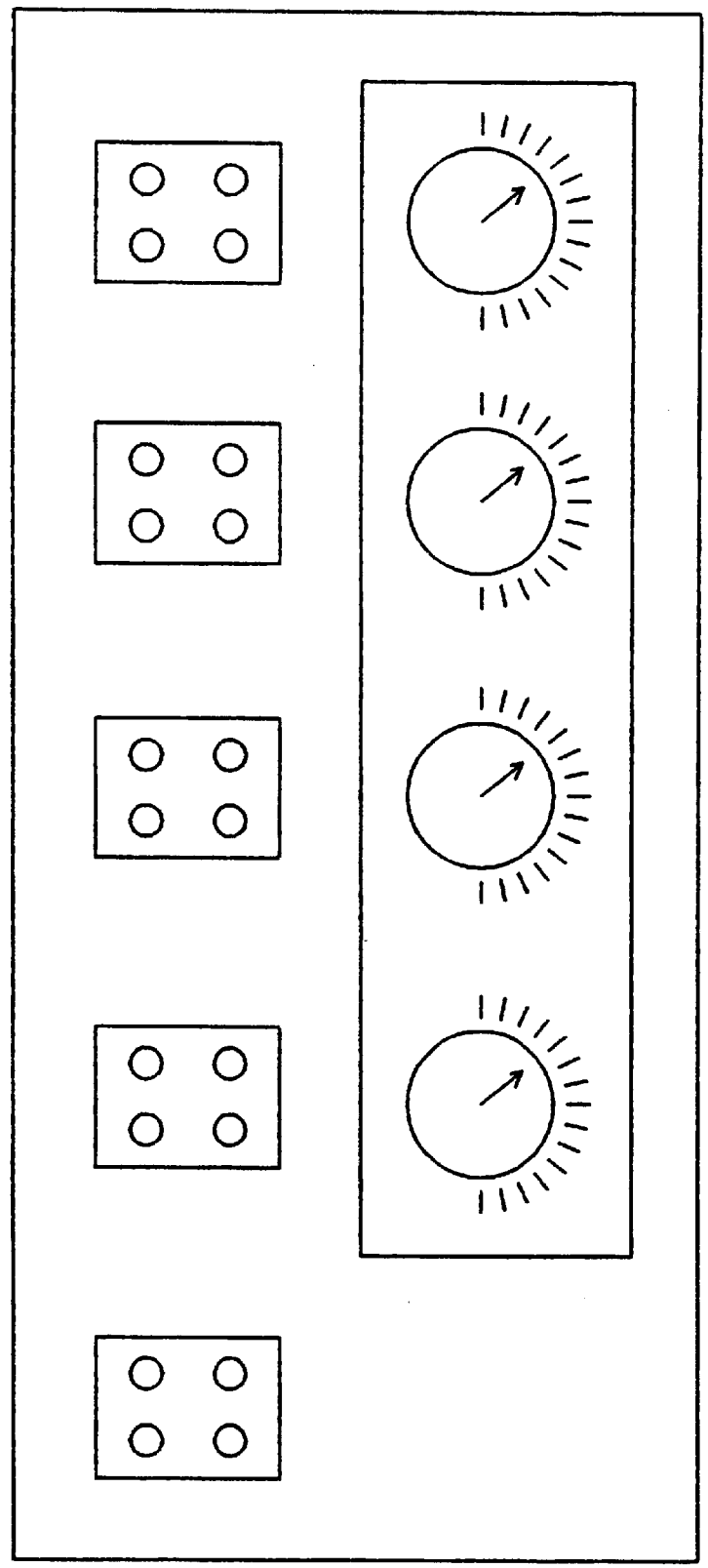
FIG. 23—shows the Central monitoring and Tuning Table, which facilitates the tuning of Time/Speed/Amount and the process according to desire and needs, and allows operation of the instrument with its various components as an integrated whole.

The rotating group comprises a rotating exterior bar (22) on which lower (17) and upper (18) frames of pentagonal, hexagonal or octagonal shape is mounted with pin seats (19) on them to receive the lower (2) and upper (3) pins of the meat boxes (1). The rotating exterior bar (22) is seated on the fixed bar (11) and is rotated by a group of gears (25) (26) connected to a single motor (24). The number and speed of the rotations is adjusted from the command and tuning table (FIG. 23). At the pentagonal arrangement with 4 cooker stations (16) and a cutting station without a cooker (15), the rotating angle is 72°. At five rotations a full circle of 360° is completed. At a hexagonal arrangement with 5 cooker stations (16) and a cutting station without a cooker (15), the rotating angle is 60° and 6 rotations complete a 360° circle. The frames where the meat boxes (1) are seated are the lower (17) and upper (18) frames. On the lower (17) and upper (18) frames there are seats (19) to receive the meat boxes (1), and the pins (2), (3) on the meat boxes (1) engage in these seats (19) so that the meat box (1) is placed on the lower (17) and upper (18) frames. The lower frame (17) is connected to the rotating exterior bar (22) from its corners with linking arms (20). The upper frame (18), on the other hand, is connected to a rotating ring (23) on the fixed central bar (11) from its corners with linking arms (20). Thus, by turning the rotating exterior bar (22) around the central fixed bar (11), lower and upper frames (17) (18), and in return, the meat boxes (1) they carry, go round the cookers as can be seen in FIGS. 13 and 14. Depenting to the number of cookers (16) the instrument of the invention has, the rotating degree of the lower and upper frames (17), (18) is adjusted from the command and tuning table (FIG. 23) via a motor (24). In this rotational movement, each cooker (16) constitutes a station and the meat box (1) is kept at each station (16) for a programmed amount of time and the cooking process is progressively completed.

4—Cutting Group

Figure 15:
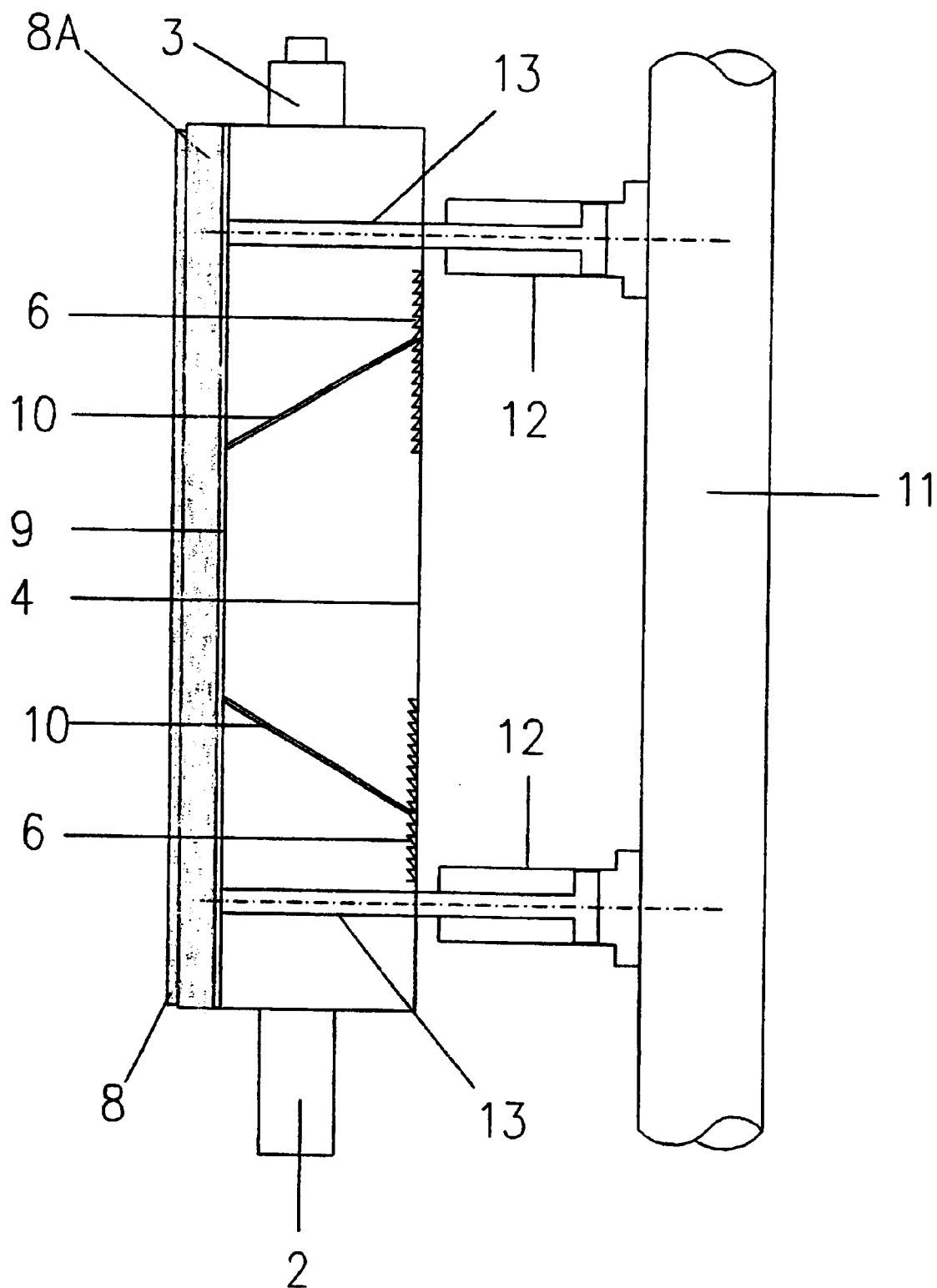
FIG. 15—shows as a side cross-section, two piston arms of the mobile pushing plate's (9) two pistons, pushing the cooked meat section that is on the open side of the meat box (1), so that it projects 3 mm from the meat box (1) and is made ready to be cut, and the resilient arms (10) behind the mobile pushing plate (9) which are pushed forward during the process and are opened rearwards and jump one tooth, entering the toothed slots (6) at the rear wall (4) of the meal box (1), so preventing the mobile pushing plate (9) from sliding back.
Figure 16:
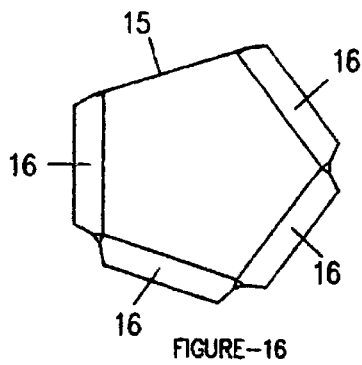
FIG. 16—shows a top view of a configuration layout of an instrument pentagonally configured with 4 cooker (16) stations and a cutting station without a cooker (15).
Figure 17:
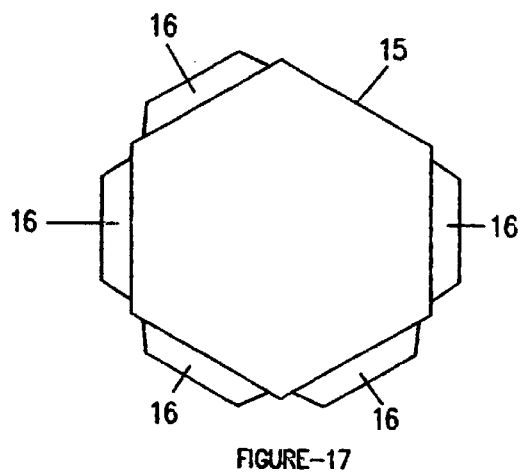
FIG. 17—is a top view of a configuration layout of an instrument hexagonally configured with 5 cooker (16) stations and a cutting station without a cooker (15).
Figure 18:
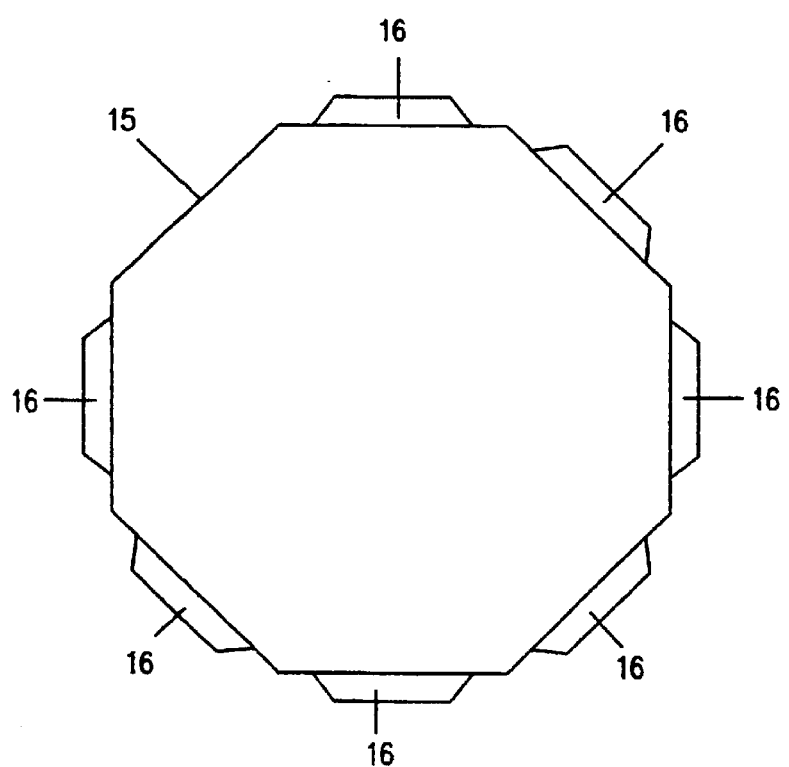
FIG. 18—is a top view of a configuration layout of an instrument hectagonally configured with 7 cooker (16) stations and a cutting station without a cooker (15).
Figure 22:
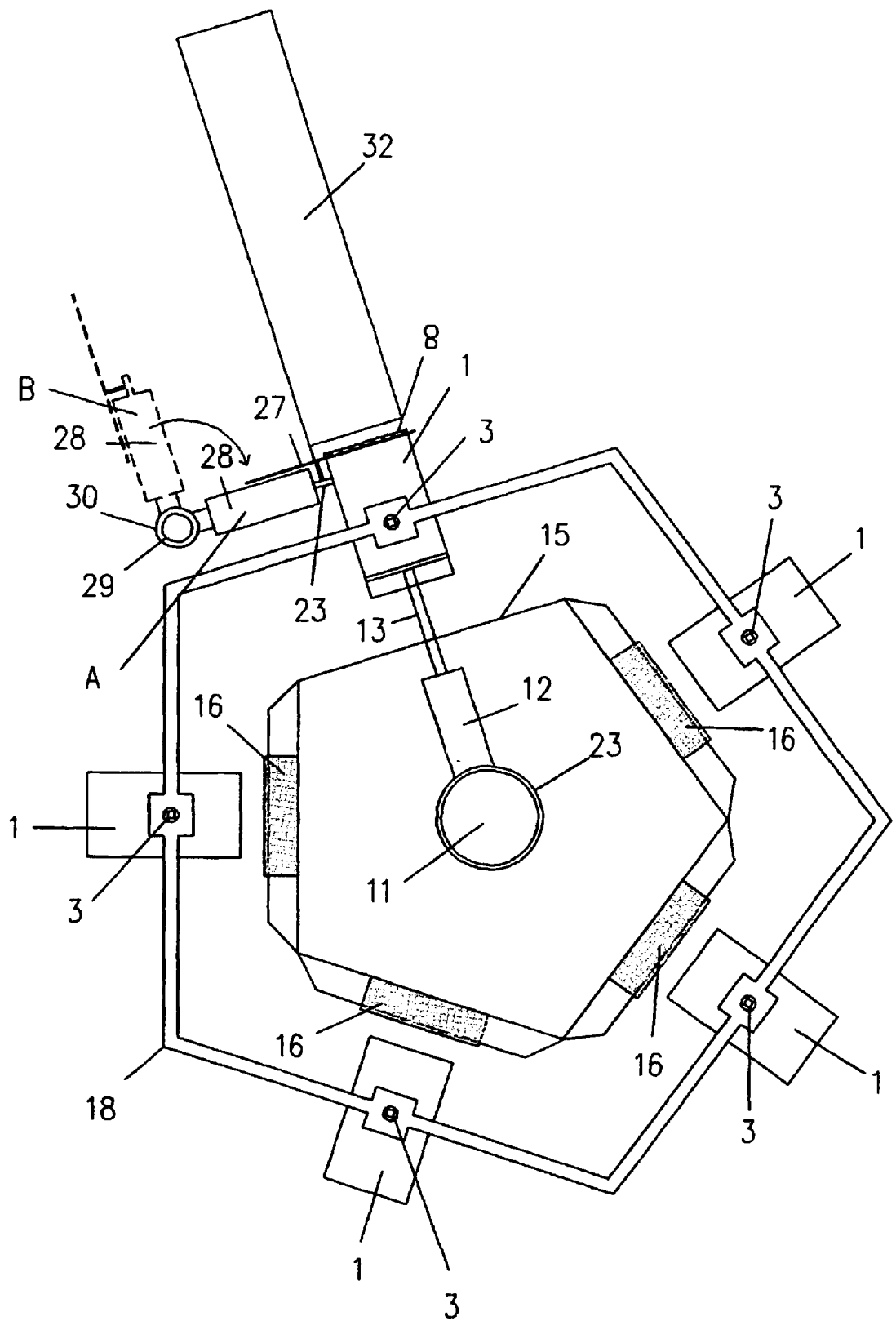
FIG. 22—shows an instrument of the invention as a whole, pentagonally configured comprising 4 cooker stations (16) and a cutting station without cooker (15) including the cutting group of the station without cooker (15).

After going around the stations step by step, the meat at the open front side of the block of meat (8A) inside the meat box (1) is cooked and ready to be cut when it comes to the cutting station without a cooker (15), and here, the slot of the rotating arm (14) connected to the main fixed bar (11) at this station (15) engages the rectangular end of the upper pin (3) of the meat box (1) and the box is rotated around its axis 180° as seen in FIGS. 13, 14 and 22, and the front side (8) containing the cooked meat is ready for cutting. After the 180° rotation is completed, pistons (12) connected to the fixed arm (11) are moved and the piston pushing arm (13) goes through the holes (5) behind the meat box (1) until the ends of the piston pushing arms (13) touch the mobile pushing plate (9) and stops the moment it touches there. After a short stopping period, the realigned piston pushing arm (13) moves forward again for just 3 mm, pushes the mobile pushing plate (9) only 3 mm forward/outwards before stopping and then returns. As a result of this process, the mobile pushing plate (9) at the back of the meat block (8A) inside the interior wall (7) which is located inside the meat box (1) is pushed forward 3 mm, the meat block (8A) is also pushed forward 3 mm and the cooked meat block at the open front side (8) of the meat box (1) is projected 3 mm and is ready to be cut. As seen in FIG. 15, the resilient arms (10) behind the mobile pushing plate (9) which is pushed forward 3 mm, are opened rearwards, and jump one tooth to enter the gear slots (6), thus, prevent the mobile pushing plate (9) from slipping back.

When the cooked meat is pushed 3 mm outside the box, the cutting process starts. As may be seen in FIGS. 19, 20 and 21, the automatic knife (27) of the cutting group is connected to a fixed bar (29) from behind with a ring (30). The automatic knife (27) moves on this bar (29) up and down and in a circular motion around the axis of the bar, again controlled by the central command and tuning table. In front of the cutting knife (27), and at the front part of the arm (33) connected to the ring (30), there is a horizontal plane (32) where the cut cooked meat slice (31) will lie. In cutting position (A) (FIG. 22), the disc knife (27) of the cutting group starts to rotate, then the knife motor (28) starts to descend in the edge seats together with the ring (30) which connects it to the fixed bar (29). The cut slice of cooked meat (31) lies on the fixed horizontal plane (32) connected to the arm (33) in front of the cutting knife (27). When the knife motor (28) reaches its lowest point the cutting process is complete and the cooked slice of meat (31) is taken away from the horizontal plane (32). When the cutting process is finished in cutting position (A) (FIG. 22), the cutting knife (27) moves up to its first position and stops, then turns 90° to its standstill (B) position (FIG. 22). At this stage where the cutting process is completed, the rotating arm (14) connected to the central fixed bar (11) moves and turns the empty meat box (1) whose cooked meat is taken away, 180° and brings it to cooking position in front of the next cooker (16) and is released from the upper pin (3) of the meat box (1). As seen in FIGS. 13, 14 and 22, when the rotating group is turned one step, the empty meat box (1) comes to the next cooker (16) station in the turning direction while the following meat box arrives at the cutting station without a cooker (15). The above process is repeated.

When the last slice is cooked, the empty box will arrive at the first station after the cutting station in the turning direction. At this stage, the empty meat box (1) will be taken away and a new full meat box (1) from the frigorific box is placed instead.

5—Central Command and (Time/Speed/Amount/Process) Tuning Table

It is preferred that the units of the integrated instrument of the invention operate together automatically. However, these are arranged in a way that would facilitate a manual tuning from the Central Command and tuning table according to the need or desire. Although all processes are integrated with each other, each of the rotating process, rotation of the meat box (1) around itself for the cutting process, the cutting process itself and the movements of the knife (27), rotating the meat box (1) again for cooking, adjusting the cooking temperature of each of the cookers (16) separately, is automatically controlled as for operation and time. Thus, it is possible to adjust time and speed for cooking, and as a result the amount. These process stages are directed by the Central Command and Tuning Table (FIG. 23).

a) Only the rotating group is operated (FIG. 23). As seen in FIG. 22, an instrument of pentagonal arrangement having 4 cookers (16) and a cutting station without a cooker, is controlled from the central command and tuning table (FIG. 23); each time the button is pressed, the gear group (25) (26) rotating the rotating group makes a "turn". This is a 72° rotation. A rotation of 5 slices makes a full circle. The temperature of the cookers during these rotations is controlled by the cooker tuning (FIG. 23) at the command table. If desired, the boxes may be rotated without any cutting, any cooking or cooking at a desired rate, at the desired intervals and for the desired periods.

b) The meat box (1) is kept at the cutting station, without rotating for cutting, for a desired period of time.

c) Although it is rotated for cutting, the meat box (1) is rotated back without cutting, then turned to other stations.

d) All of these operations are carried out from the command and tuning panel, according to needs.

In one or more of the embodiments, the following elements may be described as set out below:

1: meat box
2: lower pin
3: upper pin
4: backside of the meat box

5: hole at the back side of the meat box
5A: hole at the station without cooker
6: gear slots
7: interior wall
8: open front side of the meat box and of the meat inside it
8A: meat block inside the interior wall
9: mobile pushing plate
10: resilient arms
11: central fixed bar
12: piston
13: piston pushing arms
14: rotating arms
15: station without cooker
16: cooker
17: lower frame
18: upper frame
19: seat
20: linking arms
21: thin bar
22: rotating exterior bar
23: rotating ring
24: motor
25: gear group
26: gear group
27: disc knife
28: motor of knife
29: fixed bar
30: ring
31: cooked meat slice
32: fixed horizontal plane
33: arm

What is claimed is:

1. An integrated doner cooking and cutting instrument for obtaining cooked doner meat of standard form and cooking degree, ready to serve, characterized in that the instrument comprises separate units having separate functions working in an integrated way with each other comprising:
   a Rotating group (17) (18) (22) (23) (24) (25) (26);
   a meat box (1) comprising an interior wall (7) located in the meat box, a mobile pushing plate (9) forming a rear side of an interior wall (7), and pins (2) (3) located on a lower and an upper exterior surfaces of the meat box (1) facilitating the positioning of a carrier chassis on a plurality of seats (19) on a lower (17) and an upper (18) frames of the rotating group;
   a Cooking group (16);
   a Cutting group (27) (28) (30) (32); and
   a Central command and tuning table.

2. An integrated donor cooking and cooking instrument according to claim 1 characterised by placing a meat block (8A) to be cooked within the interior wall (7), and locating the interior wall (7) in the meat box (1) so that a front side (8) of the meat block is open.

3. An integrated doner cooking and cutting instrument according to claim 2 characterized by the interior wall (7) holding the meat block (8A) to be cooked having any desired edge shape so that the meat block (8A) inside the interior wall (7) could be obtained in any edge shape ready to serve.

4. An integrated doner cooking and cutting instrument according to claim 2 characterized by the interior wall (7) holding the meat block (8A) to be cooked having any desired edge shape so that the meat block (8A) inside the interior wall (7) could be contained in any edge shape ready to serve.

5. An integrated doner cooking and cutting instrument according to claim 1 characterized by mobile pushing plate (9) with edges having the same form as the edges of the interior wall (7) so that the pushing plate (9) can move forward and backward inside the interior wall (7) at a right angle.

6. An integrated doner cooking and cutting instrument according to claim 1 characterized by the mobile pushing plate (9) which each time pushes the meat block (8A) to be cooked 3 mm outside of the open front side of the meat box (1) placed inside the interior wall (7) so that the front side of the meat block which is cooked and ready to serve is projecting outside the meat box (1) and ready for cutting.

7. An integrated doner cooking and cutting instrument according to claim 4 characterized by a mobile pushing plate (9) having resilient arms (10) behind, which after the meat block inside the interior wall (7) is pushed 3 mm outside the meat box (1) open rearwards to enter gear slots (6) arranges at the interior side of a rear side (4) of the meat box (1), thus, preventing the mobile pushing plate (9) from slipping back and ensuring that the mobile pushing plate (9) remains in place.

8. An integrated doner cooking and cutting instrument according to claim 4 wherein the meat box (1), interior wall (7) and the mobile pushing plate (9) is manufactured from stainless steel.

9. An integrated doner cooking and cutting instrument according to claim 1 characterized by the meat box (1) preferably having dimensions of 10 cm×60 cm with a depth of 15 cm.

10. An integrated doner cooking and cutting instrument according to claim 1 characterized by the meat box (1) having a lower pin (2) and an upper pin (3) in the middle of the each lower and upper exterior surfaces thereof, to facilitate seating the pins on the rotating group and the lower (17) and upper (18) frames of the rotating group, and also having two holes (5) at the lower and upper parts of a back side wall.

11. An integrated doner cooking and cutting instrument according to claim 1 characterized by the cooking group comprising 4, 5 or 7 radiant or LPG cookers (16) standing vertically on one of a pentagonal, hexagonal and octagonal arrangement on a central fixed bar (11).

12. An integrated done, cooking and cutting instrument according to claim 11 characterized by the cookers (16) having the same height as the meat box (1).

13. An integrated doner cooking and cutting instrument according to claim 1 characterized by the Central command and tuning table able to control the cooking temperature of each cooker (16) in terms of a desired cooking temperature.

14. An integrated doner cooking and cutting instrument according to claim 1 characterized by providing a forward movement to the mobile pushing plate (9) inside the interior wall (7) towards the open front side (8) with the forward movement of 2 pistons (12) connected to the fixed bar (11) at the center of the rotating group, and a pushing arms (13) thereof.

15. An integrated doner cooking and cutting instrument according to claim 1 characterized by a rotating group comprising a carrier chassis consisting of two frames, one lower (17) and one upper (18), arranged in one of a pentagonal, hexagonal and octagonal arrangement connected to each other from corners of the frames by thin bars (21) which in turn are connected to a rotating exterior bar

(22) encasing the central fixed bar (11) and to a ring (23) again encasing the fixed bar, with horizontal arms (20).

16. An integrated doner cooking and cutting instrument according to claim 2 characterized by a rotating group having a carrier chassis with seats (19) on the lower (17) and upper (18) frames thereof to seat the meat blocks.

17. An integrated doner cooking and cutting instrument according to claim 16 characterized by placing the meat box (1) on the carrier chassis and the rotating group by engagement of the lower (2) and upper (3) pins of the meat box (1) in the seats (19) on the lower (17) and upper (18) frames.

18. An integrated doner cooking and cutting instrument according to claim 11 characterized by turning the meat box (1) with a cooked meat at an open front side (8) at the cutting station without a cooker (15) 180° around the vertical axis of the meat box for cutting the cooked front side (8) of the meat and facilitating this turning by the action of a rotating arm (14) connected to the central fixed bar (11) of the rotating group.

19. An integrated doner cooking and cutting instrument according to claim 18 wherein the turning of the meat box (1) 180° around the vertical axis through the connection of the rotating arm (14) which is placed on the fixed bar (11), to a rectangularly pointed upper pin of the meat box (1) is controlled from the Central command and tuning table.

20. An integrated doner cooking and cutting instrument according to claim 15 wherein a single motor (24) with a gear group (25) (26) provides the rotation of the exterior bar (22) around the vertical axis of the rotating exterior bar (22) connected to the lower (17) and upper (18) frames on which the meat boxes (1) are placed which is encasing the fixed bar (11).

21. An integrated doner cooking and cutting instrument according to claim 20 wherein the turning of each meat box (1) on the rotating group, which group carriers on the lower (17) and upper (18) frames the meat boxes (1), depending on the number of cooking stations on the integrated instrument, is controlled in terms of time, speed and degree of turning, so that each meat box (1) faces each cooker station in a step-by-step manner by means of a single motor (24) and a gear group (25) (26) directed by the central command and tuning table.

22. An integrated doner cooking and cutting instrument according to claim 2 wherein the meat block (8A) inside the meat box (1) is pushed 3 mm forward towards the open front side (8), when the meat (8) is cooked and ready to be cut, thus, preparing the cooked front side of meat (8A) for cutting.

23. An integrated doner cooking and cutting instrument according to claim 15 further characterized by the cutting group comprising a cutter unit having a cutter motor (28) and a rotating cutter/slicing knife (27) and a fixed horizontal plane (32) arranged in front of the cutter unit and a ring (30) facilitating the connection to the fixed bar (29) carrying them and the motion of the cutting group around the axis and an up and down motion on the fixed bar (29).

24. An integrated doner cooking and cutting instrument according to claim 23 characterized by having a horizontal plane (32) in front of the arm (33) which carries the mobile cutting unit and is connected to the ring (30), for the cooked meat slices to lie as they are cut, and by the length of this horizontal plane (32) being the same as the length of the meat box (1).

25. An integrated doner cooking and cutting instrument according to claim 23 characterized in that during a cutting position the knife (27) connected to the ring on the cutting unit moves downwards along the fixed bar (29) through the cutting process and then returns upwards to an original position and this vertical movement in the cutting position is controlled via the Central command and tuning table.

26. An integrated doner cooking and cutting instrument according to claim 25 characterized by bringing the cutting group to a standstill position by turning 90° around the axis of the fixed bar (29) after the knife (27) returns to the original position at the end of the cutting process.

27. An integrated doner cooking and cutting instrument according to claim 26 wherein the initiation of the cutting, the downward movement on the fixed bar (2) during the cutting process at the cutting position, the upward movement after the cutting is completed and the turning by 90° to the standstill position of the cutting group is controlled from the Central command and tuning table.

28. An integrated doner cooking and cutting instrument according to claim 26 wherein the movement of the meat box (1) with the cooked part of the meat block at the open front side (8), by 180° around the vertical axis, then, the meat block being positioned in front of the next cooker station (16) to let the front side (8) of the uncooked meat block (8A) be cooked, is being controlled automatically or by instruction from the central command and tuning table.

29. An integrated doner cooking and cutting instrument according to claim 2 wherein the cooking and cutting processes are continued until the relative meat box (1) is completely empty as a result of the cooking and cutting of the raw meat block (8A).

30. An integrated doner cooking and cutting instrument according to claim 21 characterized by continuous operation of the integrated instrument by the removal of the completely empty meat box (1) at the lower (17) and upper (18) frames of the rotating group after the last slice is taken at the cutting station without cooker (15) and putting in a new meat box (1) full or meat block (8A) to be cooked, and moving the rotating motor (24) and the gears (25) (26) one step ahead from the central command and tuning table so that the new meat box (1) is brought to the opposite of the cooker (16).

31. An integrated doner cooking and cutting instrument according to claim 30 wherein an integrated instrument whose units only operate in an integrated and connected way is provided, and, within this framework, the rotation of the meat boxes (1) around a fixed cooker group around the fixed bar at a certain speed and intermittence, positioning thereof opposite the cutting station without a cooker and getting into cutting position by turning 180°, positioning of the cutting group for the cutting process and horizontal and vertical movements, and cooking duration and temperatures of the cookers (16) are controlled and tuned from a Central command and tuning table automatically or manually.

32. An integrated done cooking and cutting instrument according to claim 11 characterized by adjustment of the cooking degree and amount of the cooked doner meat to be obtained according to the number of cookers and cooking temperatures and the rotating speed of the rotating group.

33. A method for obtaining cooked doner meat comprising the steps of:
 (a) providing the meat box of the cooking and cutting apparatus of claim 1 with a meat block;
 (b) maintaining said meat box opposite of each cooker for a cook period.

34. The method of claim 33 comprising the additional step of preparing the meat block before providing the meat block to the meat box by obtaining a meat block of standard shape and form.

35. The method of claim 33 comprising the additional steps of automatically cooking said meat block to a desired doneness and automatically cutting the cooked meat block.

36. A method for obtaining cooked donor meat comprising the steps of:
(a) providing the meat box of the cooking and cutting apparatus of claim 1 with a meat block; and
(c) rotating said meat box past cookers of the cooking group at a cook speed.

* * * * *

UNITED STATES PATENT AND TRADEMARK OFFICE
CERTIFICATE OF CORRECTION

PATENT NO.    : 6,582,744 B1
DATED         : June 24, 2003
INVENTOR(S)   : Ayhan Babacan It is certified that error appears in the above-identified patent and that said Letters Patent is hereby corrected as shown below:

<u>Column 12,</u>
Line 1, "(c)" should read -- (b) --.

Signed and Sealed this

Seventh Day of October, 2003

JAMES E. ROGAN
*Director of the United States Patent and Trademark Office*